United States Patent
Klischat et al.

(10) Patent No.: US 8,030,236 B2
(45) Date of Patent: Oct. 4, 2011

(54) FIRE-RESISTANT ORDINARY CERAMIC BATCH, AND FIRE-RESISTANT PRODUCT THEREFROM

(75) Inventors: Hans-Jürgen Klischat, Göttingen (DE); Carsten Vellmer, Göttingen (DE); Holger Wirsing, Göttingen (DE)

(73) Assignee: Refratechnik Holding GmbH, Ismaning (DE)

( * ) Notice: Subject to any disclaimer, the term of this patent is extended or adjusted under 35 U.S.C. 154(b) by 99 days.

(21) Appl. No.: 12/280,063

(22) PCT Filed: Feb. 6, 2007

(86) PCT No.: PCT/EP2007/051118
§ 371 (c)(1),
(2), (4) Date: Dec. 17, 2008

(87) PCT Pub. No.: WO2007/096246
PCT Pub. Date: Aug. 30, 2007

(65) Prior Publication Data
US 2009/0227442 A1 Sep. 10, 2009

(30) Foreign Application Priority Data
Feb. 20, 2006 (DE) .......................... 10 2006 007 781

(51) Int. Cl.
*C04B 35/043* (2006.01)
*C04B 35/20* (2006.01)
(52) U.S. Cl. ........................................ 501/122; 501/108
(58) Field of Classification Search .................. 501/122, 501/108
See application file for complete search history.

(56) References Cited

U.S. PATENT DOCUMENTS

| | | | | | |
|---|---|---|---|---|---|
| 2,026,088 | A | * | 12/1935 | Frederic et al. | 501/122 |
| 2,516,249 | A | * | 7/1950 | Osborn | 501/112 |
| 4,789,510 | A | * | 12/1988 | Toda | 264/612 |
| 5,204,298 | A | * | 4/1993 | Yaoi et al. | 501/108 |
| 2005/0181928 | A1 | * | 8/2005 | Hayward et al. | 501/108 |

FOREIGN PATENT DOCUMENTS

| JP | 06128023 | * | 5/1994 |
|---|---|---|---|
| JP | 07048167 | * | 2/1995 |
| JP | 07315913 | * | 12/1995 |

OTHER PUBLICATIONS

Machine translation of JP document 06-128023,May 1994.*

* cited by examiner

*Primary Examiner* — Karl Group
(74) *Attorney, Agent, or Firm* — Andrew F. Young, Esq.; Lackenbach Siegel, LLP

(57) ABSTRACT

Disclosed are a fire-resistant ordinary ceramic batch and a fire-resistant product predominantly comprising a) at least one granular, fire-resistant, mineral, alkaline main component made of an MgO-based or MgO and CaO-based fire-resistant material that is based on at least one alkaline fire-resistant raw material, and b) at least one granular, fire-resistant, mineral, MgO-based, additional elasticator in the form of a forsterite material or a mixture forming forsterite material preferably as small molded articles, such as pellets or granulate that is comminuted from compacts. The small molded articles have a grain size ranging from 0.3 to 8 mm while being advantageously provided with a binder at an amount that elasticates the main component.

21 Claims, 3 Drawing Sheets

FIRE-RESISTANT ORDINARY CERAMIC BATCH, AND FIRE-RESISTANT PRODUCT THEREFROM

The invention relates to a coarse-ceramic refractory batch (mix) and a refractory product comprising predominantly a granular refractory mineral basic main component (hereinafter also referred to as resistor) composed of a basic refractory material based on the basic refractory base material MgO or MgO and CaO and at least one granular refractory mineral elasticizing additive (hereinafter also referred to as elasticizer).

A coarse-ceramic refractory batch (mix) is a mixture from which coarse-ceramic refractory products, e.g. a shaped body, unfired or fired, or monolithic refractory linings of, for example, industrial furnaces or metallurgical vessels, can be produced.

In the present technical field, granular means a relatively wide range of particle sizes, e.g. a main component or an elasticizer comprising a coarse fraction having particles of <15 mm, e.g. in the range from 1 to 8 mm, in amounts of, for example, from 20 to 50% by weight, a medium fraction, e.g. in the range from 0.25 to 1 mm, in amounts of, for example, from 10 to 30% by weight and a fine fraction, e.g. <0.25 mm, in amounts of, for example, from 20 to 60% by weight.

A refractory main component is the material of the batch (mix) which is present in the batch (mix) in a predominant amount which is sufficient to ensure the desired refractory properties of a product produced from the batch (mix). Accordingly, a refractory batch (mix) generally contains over 60% by weight of the main component.

The main component comprises at least one refractory base material and/or at least one refractory material based on a refractory base material, with a material mainly being a compound of a base material with other base materials (Gerald Routschka, Taschenbuch "Feuerfeste Werkstoffe", 3rd edition, Vulkan-Verlag, Essen, pp. 1-10).

Elasticizers are granular refractory, mineral materials which are usually based on compounds of the base materials and are generally present in the batch (mix) in amounts of from 3 to 30% by weight, based on the sum of elasticizer and main component. They generally bring about microcrack formation in the matrix or in the microstructure of a refractory product formed from the batch (mix), e.g. a shaped body or a monolithic lining, and sometimes also after a surface reaction between the material of the main component and the material of the elasticizer at high temperatures and subsequent cooling as a result of different coefficients of expansion. This elasticization reduces the modulus of elasticity (E modulus) and shear modulus (G modulus) and thus the brittleness of the ceramic products and increases the temperature change resistance or the thermal shock resistance.

For basic main components such as magnesia or magnesia-doloma or doloma, elasticizers whose coefficient of thermal expansion is considerably above or below that of the main component are used. For example, chromium ores, spinels of the hercynite type, zirconium oxides, pleonast, MA spinels, calcium hexaaluminate ($CA_6$) and emery are used as elasticizers (DE 35 27 789 A1, DE 102 59 826 B4, DE 101 17 026 B4, DE 101 17 028 B4).

The elasticizers or the reaction phases between elasticizer and main component essentially reduce the chemical resistance, in particular the resistance of the refractory products to mineral melt phases which act on them in industrial furnaces or metallurgical vessels. In addition, a targeted reduction of the E or G modulus to predetermined desired values which may be required can be controlled only via the amount of elasticizer added and then only roughly because the microcrack formation in the microstructure has to be distributed uniformly and present in a closely spaced fashion and this is only ensured by appropriate added amounts of the elasticizer.

In particular, there is a need for basic refractory batches (mixes) from which refractory products can be produced or refractory minerals are formed in situ, which have improved resistance to siliceous melt phases which occur in rotary cement furnaces or lime burning furnaces, e.g. in lime shaft furnaces, and originate from the material being fired, e.g. the cement clinker raw material, and also ensure durable desired crust formation on the refractory lining, in particular in parts of rotary tube furnaces. In addition, the refractory linings should have a good temperature change resistance or thermal shock resistance. These problems are described, for example, in WO 2004079284 A1, in particular pages 1 to 3, paragraph 2, whose disclosure content is incorporated by reference into the disclosure of the present invention.

The desired properties in respect of elasticization and crust formation can also not be satisfactorily ensured by the refractory products which are described in WO 2005085155 A1 and are elasticized by means of $SiO_2$ supports and in which microcracks are said to be formed as a result of $SiO_2$ volume changes even during initial temperature increases at relatively low temperatures; this premature microcrack formation is very difficult to control and the microcracks can heal again at high temperatures as a result of mineral-forming reactions, so that their desired effect is lost again.

It is an object of the invention to develop a coarse-ceramic, basic, refractory batch (mix) and refractory products made therefrom, which can be elasticized by means of elasticizing additives which ensure a high resistance to, in particular, siliceous melt phases and ensure good crust formation without an adverse effect on the elasticization and preferably also make control of the degree of elasticization possible.

This object is achieved, in particular, by the features of claims 1 and 19. Advantageous embodiments of the invention are defined in the dependent claims.

For the purposes of the invention, the following materials based on the basic base materials MgO and CaO were selected as main component from among the many basic refractory materials (see Routschka, pp. 144 to 147):

| Material | Chemical composition |
| --- | --- |
| Magnesia | 85-99% by weight of MgO |
| Magnesia doloma | 42-88% by weight of MgO |
|  | 10-50% by weight of CaO |
| Doloma | 35-42% by weight of MgO |
|  | 50-62% by weight of CaO |

These materials can comprise smaller amounts of impurities originating from the raw materials in amounts of up to 156 by weight, e.g. calcium compounds in amounts of generally up to 5% by weight in compounds with $Al_2O_3$, $Fe_2O_3$ and/or $SiO_2$.

In combination with these basic main components, basic, refractory MgO-based forsterite materials (Routschka, pp.

204-206) which are known per se and consist of the mineral forsterite (formula of the mineral phase: $Mg_2SiO_4$; oxide formula: $2\ MgO.SiO_2$; abbreviated formula: $M_2S$) or comprise a predominant proportion of this mineral and have hitherto served as main component in refractory batches (mixes) or refractory products surprisingly have an elasticizing effect. The materials comprising predominantly the mineral forsterite are forsterite materials which can contain CaO in the manner of a dopant in solid solution in the crystal lattice of forsterite and can be described by an oxide formula $2\ (Mg, Ca)O.SiO_2$ or comprise MgO or $SiO_2$ in solid solution in the crystal lattice of forsterite or of forsterite materials in which both CaO and MgO and also CaO and $SiO_2$ are present in solid solution in the crystal lattice of forsterite.

The forsterite materials also include materials which comprise predominantly forsterite and contain FeO and/or $Fe_2O_3$ in the manner of a dopant in solid solution in the crystal lattice of the forsterite and can be described by an oxide formula $2\ (Mg, Fe)O.SiO_2$ or comprise MgO or $SiO_2$ in solid solution in the crystal lattice of forsterite or are forsterite materials in which both FeO and/or $Fe_2O_3$ and MgO and also FeO and/or $Fe_2O_3$ and $SiO_2$ are present in solid solution in the crystal lattice of forsterite.

Figure 2:
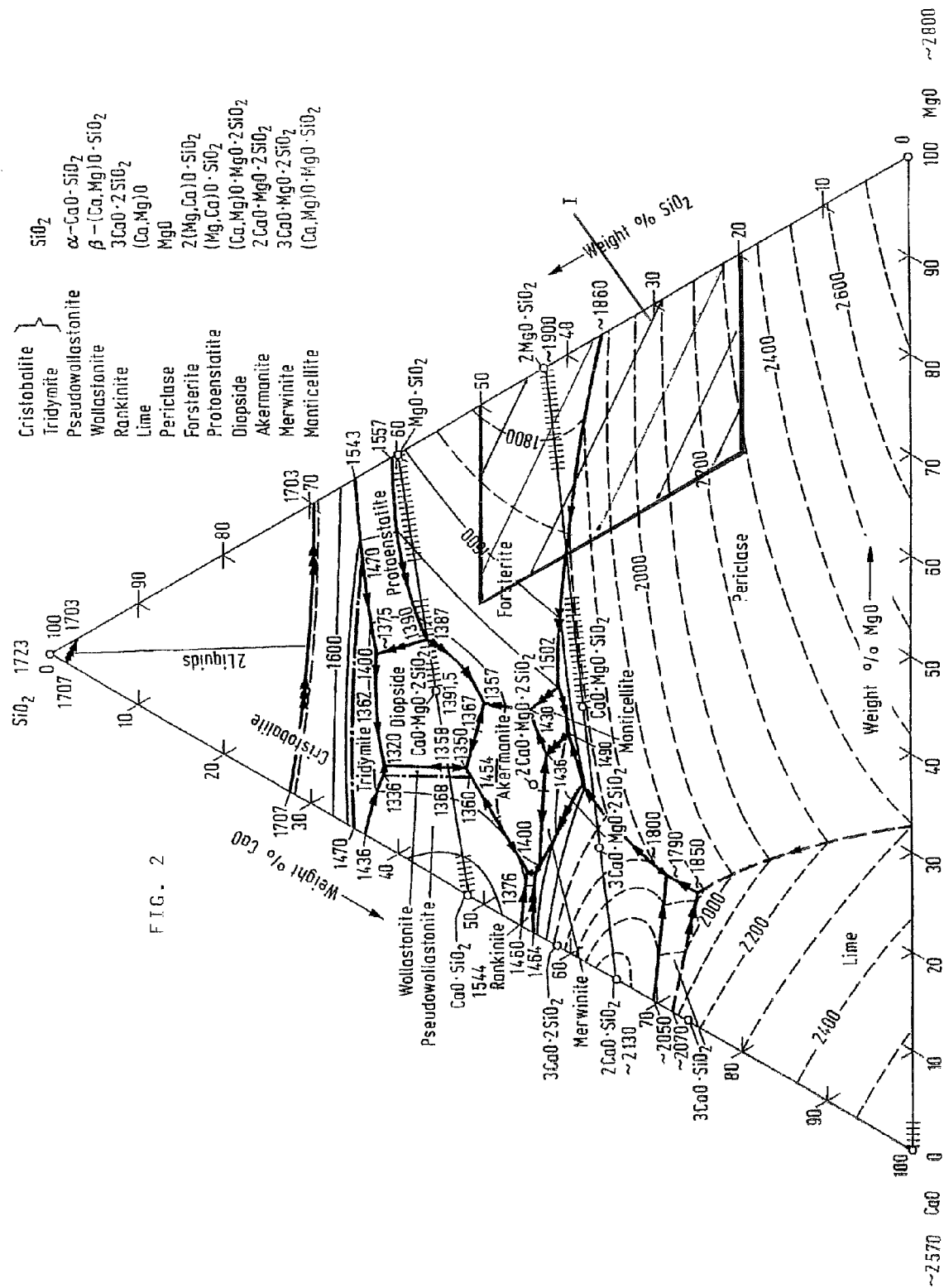
FIG. 2 is a ternary diagram of the three-component system CaO—MgO—$SiO_2$.

In FIG. 2, which depicts the three-component system CaO—MgO—$SiO_2$ with % by weight, the region I of the forsterite elasticizers used according to the invention is shown as a hatched area. Accordingly, the forsterite material, which can contain from 50 to 80% by weight of MgO and from 20 to 50% by weight of $SiO_2$, can contain from 0 to 20% by weight of CaO, with an optimal combination in respect of elasticization and crust formation being achieved according to the invention when the CaO content is not more than 5% by weight and the MgO content is not more than 25% by weight and the $SiO_2$ content is not more than 7% by weight above the stoichiometric weight ratio of forsterite $M_2S$ or $2\ MgO.SiO_2$. The region representing this forsterite material which is selected according to the invention is marked in FIG. 2 by oblique hatching within the forsterite and periclase region.

Figure 3:
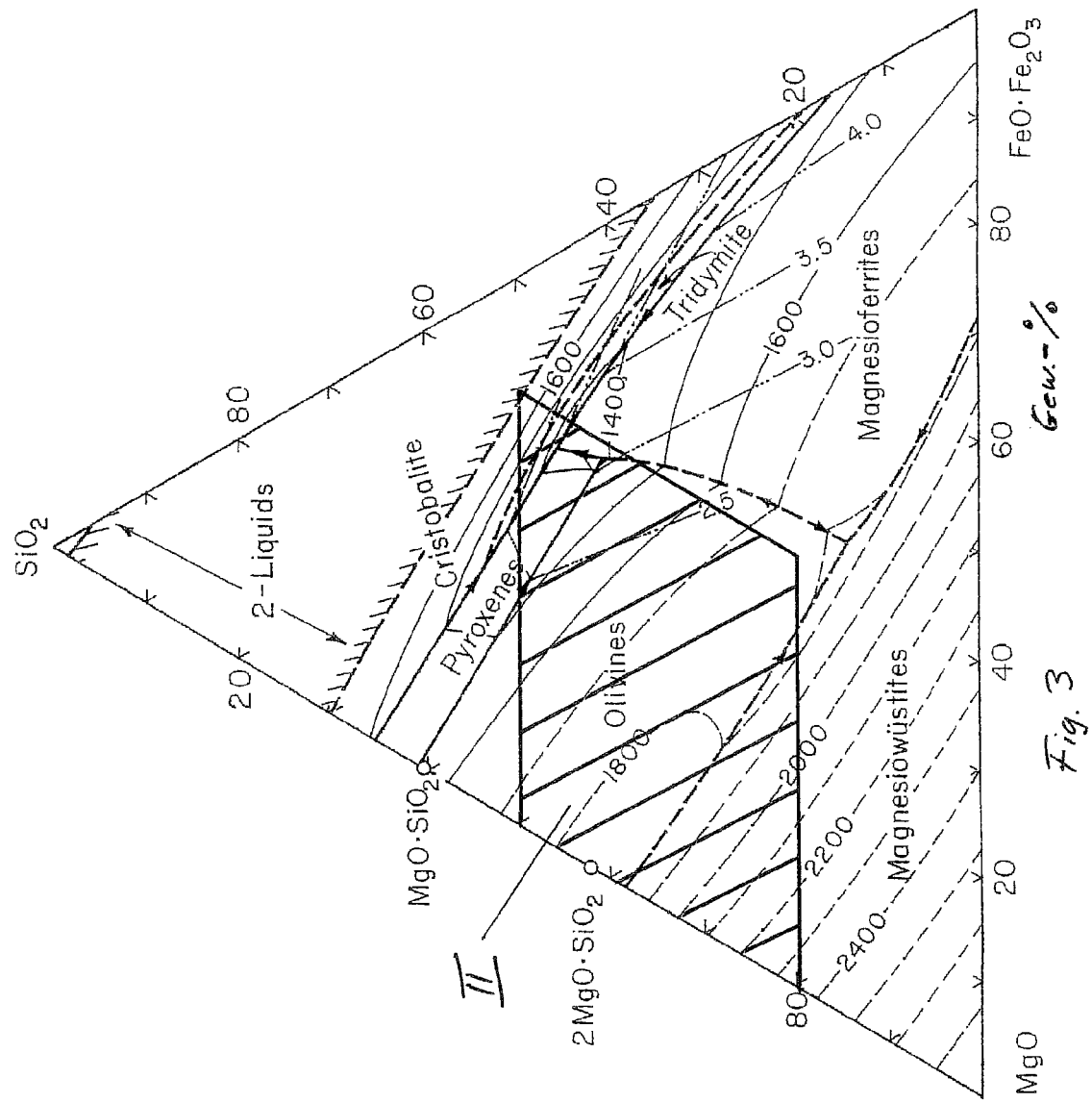
FIG. 3 is a ternary diagram of the three-component system $SiO_2$—FeO $Fe_2O_3$—MgO.

In FIG. 3, which shows the three-component system $SiO_2$—FeO, $Fe_2O_3$—MgO with % by weight, the region II of the iron-containing forsterite elasticizer is shown as a hatched area. Thus, olivine can be present in the forsterite material. In addition, the forsterite material, which can contain from 50 to 80% by weight of MgO and from 20 to 50% by weight of $SiO_2$, can contain from 0 to 40% by weight of FeO, $Fe_2O_3$. In particular, it is advantageous for the FeO, $Fe_2O_3$ content to be not more than 15% by weight and the MgO content to be not more than 25% by weight and the $SiO_2$ content to be not more than 7% by weight above the stoichiometric weight ratio of forsterite $M_2S$ or $2\ MgO.SiO_2$. The region representing this forsterite material which is selected according to the invention is marked in FIG. 3 by a hatched area within the olivine and magnesiowuestite region.

The elasticizing and crust-forming effect of forsterite in combination with a basic resistor material has hitherto been unknown. Only refractory forsterite batches (mixes) or products which comprise forsterite as main component and may be mixed with magnesia to bind iron oxide and/or elasticized by means of chromium ore in the usual way are known.

Refractory products which contain MgO as granular main component and have forsterite material as binder in the fine-grain matrix are also known. The crystalline forsterite ensures bonding between the MgO grains in the form of a network which is formed in a vitreous composite material. As forsterite material, it is also possible to use the natural mineral olivine (U.S. Pat. No. 2,026,088 A). The fine-grain binder phase in the matrix is not an elasticizing material. An elasticizer does not provide any such compounds; rather, it acts as separate secondary component due to different coefficients of expansion.

In a particular embodiment of the invention, a forsterite mineral and/or forsterite material is used as elasticizing and crust-forming additive which has included periclase grains distributed in its forsterite matrix. These periclase grains have grain sizes in the range from 30 to 900 µm, preferably from 50 to 200 µm, and are present in amounts of up to 25% by weight, in particular from 3 to 156 by weight. It is surprising that the E modulus and G modulus of a fired product can be controlled via the amount of these periclase particles included in the forsterite or forsterite material matrix or surrounded by the matrix, with a relatively high modulus being able to be set by means of relatively large included amounts and a relatively low modulus being able to be set by means of relatively small included amounts. This can be seen, for example, from table 1 below. The forsterite material was synthesized e.g. fused, from the raw materials magnesia and $SiO_2$ powder (flour), e.g. silica or cristobalite or tridymite powder (flour) or mixtures thereof, quartz powder (flour), and was mixed as elasticizer, in each case in an amount of 15% by weight, into a sintered magnesia containing 98% by weight of MgO which formed the main component. The batches (mixes) containing in each case 15% by weight of elasticizer and the magnesia batch (mix) without elasticizer were subjected to ceramic firing at 1600° C. and subsequently analyzed.

TABLE 1

| Magnesia(% by weight) | Forsterite material (% by weight) | MgO inclusions (% by weight) | E modulus (GPa) | G modulus (GPa) |
|---|---|---|---|---|
| 95 | 15 | 0 | 22 | 9 |
| 95 | 15 | 4 | 23 | 11 |
| 95 | 15 | 6 | 27 | 13 |
| 95 | 15 | 12 | 40 | 19 |
| 100 | 0 | 0 | 110 | 40 |

It can be seen from table 1 that a batch (mix) according to the invention can in a simple way be given different E and G moduli by provision of forsterite additive with different amounts of periclase grains within the matrix and introduction of different forsterite additive into batches (mixes), with the amounts of the forsterite elasticizer and in particular, for example, the grain structure in each case remaining unchanged and only the type of forsterite elasticizer in terms of the periclase grain content being altered.

Periclase or MgO inclusions can be produced both in elasticizers comprising forsterite mineral and elasticizers comprising forsterite material which may contain CaO or FeO/$Fe_2O_3$ by means of appropriate ceramic processes known to those skilled in the art.

The influencing of the E and G moduli by increasing the periclase contents is associated with an increase in the resistance of the products to attack by melt phases, e.g. in the firing of cement in a rotary tube furnace, or attack by CaO in a lime shaft furnace. The higher the periclase grain content in the elasticizer matrix, the higher the resistance of the refractory batch (mix) or the refractory product to attack by slags or melt phases. In this way, the invention also provides an opportunity of optimizing desired properties in terms of elasticity and resistance.

It is of course also possible to blend these different forsterite elasticizers to obtain additives which have intermediate periclase grain contents between those of the abovementioned elasticizers. An advantage here is that the elasticizer can in each case be used in an unchanged particle fraction and an unchanged amount so that the refractory batch (mix) including the main component can remain unchanged in respect of the total grain structure.

Figure 1:
FIG. 1 is a microstructure photograph of the product.

FIG. 1 shows the forsterite matrix as a polished section in an optical photomicrograph. The scale is shown by a 100 μm bar at bottom right within the image. The dark regions 1 are pores. The light regions show the matrix of the forsterite material 2. More or less delineated periclase regions 3, which can have diameters of up to 200 μm, are included in the matrix. To produce the forsterite material, a mixture of quartz powder (flour) and sintered magnesia powder (flour) in the ratio $M_2S$ with a 5% by weight excess of MgO was sintered at 1630° C., subsequently cooled and the product was crushed.

The main components and the elasticizers of the batches (mixes) according to the invention are used in the particle size ranges customary in each case, e.g. as indicated above, and in the customary particle distributions, and form, for example, batches (mixes) which in terms of the particle size correspond to typical Fuller curves.

To produce refractory elasticized products, shaped bodies can be produced from the batches (mixes) and, if appropriate, be heat treated and/or subjected to ceramic firing.

Furthermore, customary binders can be added in customary amounts to the batches (mixes), e.g. before shaping. These are, for example, cement, in particular aluminous cement, lignosulfonates, alkali metal silicates, phosphates, sulfates, pitch, synthetic resins. Addition of metallic and nonmetallic additives such as Al or SiC, which may act as antioxidants, is also possible.

In addition, it can be advantageous to add carbon, e.g. graphite, in customary amounts to the batches (mixes).

The binder-containing batches (mixes) can be used for producing monolithic linings or be shaped to produce shaped bodies. The shaped products can be incorporated in the unfired state into linings, with elasticization occurring in situ as a result of the high temperatures. However, the shaped products can also be heat treated and/or fired and in this way elasticized and subsequently be installed.

According to the invention, a batch (mix) according to the invention contains, based on the sum of elasticizer and main component, preferably from 3 to 30% by weight, in particular from 10 to 20% by weight, of the forsterite elasticizer in a particle size of, for example up to 8 mm, in particular from 1 to 6 mm, if appropriate with a customary particle size distribution.

A main component of a batch (mix) according to the invention has, for example, a particle size up to 8 mm, in particular from 1 to 5 mm, likewise if appropriate with a customary particle size distribution.

The forsterite elasticizer is presynthesized by intimately mixing a finely pulverulent MgO component, e.g. sintered magnesia or fused magnesia or caustic magnesia having an MgO content of from 90 to 1006 by weight, in particular from 93 to 99% by weight, with a finely pulverulent $SiO_2$ or $SiO_2$-containing component, e.g. quartz powder (flour), soapstone or olivine having an $SiO_2$ content of from 30 to 100% by weight, in particular from 40 to 99% by weight, in the molar ratio $M_2S$ or with a desired excess of MgO or $SiO_2$, subsequently synthesizing, e.g. fusing, the mixture at temperatures in the range from 1600 to 2300° C., cooling and crushing the product obtained.

To produce the elasticizer having an excess of MgO in the form of periclase grains in the forsterite matrix, the MgO component is added in an appropriate excess and firing or fusion is carried out in such a way that the desired matrix is formed. The production conditions are dependent on the raw material and can be determined empirically in a simple way.

If and in so far as CaO is also to be present in particular amounts in the elasticizer, a finely divided CaO component, e.g. quicklime or hydrated lime, having the appropriate fineness is mixed in an appropriate amount into the starting mixture or doloma is used as raw material.

If FeO and/or $Fe_2O_3$ is also to be present in particular amounts in the elasticizer, e.g. instead of CaO, a finely divided FeO and/or $Fe_2O_3$ component, e.g. magnetite or hematite, having an appropriate fineness is added to the starting mixture or olivine is used as raw material.

It is within the scope of the invention to bring about forsterite formation in situ, i.e. in a shaped Mgo-based refractory batch (mix) or product, e.g. in an unfired shaped body or in a monolithic, unfired lining, at high temperatures by adding a finely divided $SiO_2$ component in powder form to an MgO- or MgO/CaO-based granular main component in an amount which at temperatures in the range from 1400 to 1700° C. results in reaction with part of the MgO present in the main component to form forsterite material, in particular forsterite ($M_2S$). The reaction occurs essentially between the powder fractions of the main component and of the $SiO_2$ component, e.g. quartz powder (flour).

Preferred batches (mixes) of this type have, for example, the following compositions:

from 80 to 99% by weight, in particular from 90 to 98% by weight, of MgO main component (e.g. sintered or fused magnesia containing from 90 to 100% by weight, in particular from 93 to 99% by weight, of MgO), from 1 to 20% by weight, in particular from 3 to 10% by weight, of $SiO_2$ component (e.g. quartz powder (flour) containing from 93 to 100% by weight of $SiO_2$)

with, for example, the following particle fractions (customary particle size distribution)

MgO Main Component 1-8 mm: from 20 to 50% by weight, in particular from 40 to 50% by weight 0.25-1 mm: from 10 to 30% by weight, in particular from 15 to 25% by weight <0.25 mm: from 20 to 60% by weight, in particular from 25 to 55% by weight $SiO_2$ Component <0.25 mm: from 50 to 90% by weight, in particular from 70 to 80% by weight 0.25-1 mm: from 10 to 50% by weight, in particular from 20 to 30% by weight The shaped bodies which are preferably produced from the mixtures and may if appropriate comprise customary binders and if appropriate graphite and have been shaped in a customary manner are preferably heat treated and/or fired, resulting in forsterite or forsterite material being formed and the shaped body being elasticized on cooling. However, the unfired shaped bodies or batches (mixes) can also be incorporated in linings and exposed to firing in an industrial furnace in regions which are subjected to temperature changes, resulting in forsterite phases which act as elasticizers and reduce thermal expansion or shrinkage in the case of process-related reductions in the temperature being formed at least in the fire-side surface region of the shaped bodies or lining.

The in-situ formation of the forsterite phase leads, particularly advantageously, to optimal and durable crust formation, e.g. in the sintering zone of a rotary tube cement furnace, and to the desired optimal elasticization of the lining material and also to a particularly high resistance to melt phases from the firing product in the firing apparatus, so that use of such materials in, for example, static lime facilities is also advantageous.

In contrast to previous procedures in which an attempt is made to avoid penetration of relatively low-melting melt phases into the refractory products as far as possible, the invention provides for formation of a relatively reactive phase, namely forsterite or forsterite material, in order to simplify crust formation in an industrial furnace while at the same time not significantly impairing the heat resistance and resistance to melt phases and also ensuring elasticization. This is surprisingly achieved by means of the forsterite or forsterite material used according to the invention or generated in situ. It is probable that a first melt phase infiltration into the refractory product is stopped at relatively low temperatures and the heat resistance and resistance to melt phases is obviously increased again when the forsterite phase comes into contact with the primary melt phases, e.g. from a material being fired, e.g. from cement clinker melt phases, and magnesium ferrites and high-melting calcium silicate phases are formed in addition to a second melt phase in the refractory product. As a result, further infiltration is very probably slowed or even prevented. In contrast thereto, the reaction products in the known magnesia spinel bricks are low-viscosity melt phases which accelerate further infiltration.

In respect of the combined action of the elasticizer in respect of elasticization, crust formation and resistance, it is particularly advantageous to use the forsterite material in the form of olivine. As is known, olivine has the chemical formula $(Mg, Fe)_2SiO_4$ and generally comprises 48-50% by weight of MgO, 41-43% by weight of $SiO_2$ and 6.1-6.6% by weight of FeO. In addition, in each case less than 1% by weight of $Cr_2O_3$, $Al_2O_3$, NiO, MnO and/or CaO can be present. Olivine is a naturally occurring mineral and is a mixed crystal composed of about 93% by weight of the mineral forsterite $Mg_2SiO_4$ and about 6% by weight of the mineral fayalite $Fe_2SiO_4$. In addition, it is possible for, for example, periclase (MgO) in amounts of 3-6% by weight and also enstatite ($MgSiO_3$) in amounts of <5% by weight and serpentine, talc and chromite in amounts of <16 by weight to be present. Olivine serves in unfired form as refractory material, e.g. as main component for the production of forsterite bricks or as slag-conditioning agent in the blast furnace process.

The use of this natural, relatively inexpensive mineral olivine has the particular advantage that in this case, too, no presynthesized material has to be produced. In particular, the fayalite of the mixed crystal and its transformation products promotes a reaction with the material being fired at the surface of the brick and thus crust formation and lastingly stabilizes the crust coating on the lining. In addition, olivine also provides more intensive elasticization as a result of a greater reduction in the E and G moduli at the same added amount compared to presynthesized forsterite or forsterite material and at the same particle size fractions.

Advantageous batches (mixes) containing olivine have the following compositions:
MgO material: from 70 to 97% by weight, in particular from 80 to 90% by weight
olivine: from 3 to 30% by weight, in particular from 10 to 20% by weight The particle size fractions are in the abovementioned ranges for a batch (mix) containing granular elasticizing additive.

When olivine is used as elasticizer, it is possible, for example, to reduce the E modulus of fired magnesia bricks from 110 GPa for pure sintered magnesia bricks down to 20 GPa for an added amount of 15% by weight and reduce the G modulus from 40 to 8 GPa.

It is within the scope of the invention to mix granular presynthesized forsterite or granular presynthesized forsterite material with olivine particle fractions to produce an elasticizer component and add this to a main component in order to control or influence the crust formation capability and the elasticization of a refractory product, in particular at unchanged amounts and unchanged particle size fractions of the elasticizer, so that the formulation of a batch (mix) according to the invention can remain unaltered in respect of the particle size fractions.

It is within the scope of the invention to mix mainly an elasticizing, granular component with the granular main component to produce a batch (mix) which comprises only the raw materials for in-situ formation of forsterite or forsterite material. Accordingly, a batch (mix) according to the invention comprises the elasticizer as small shaped bodies, e.g. in the form of pellets, or as pressed compacts of comminuted granular material having particle sizes of from 0.3 to 8 mm. The small shaped bodies or granular materials consist essentially of a mixture of the ground powders of at least one MgO component and at least one $SiO_2$ component, with CaO or $FeO/Fe_2O_3$ components also being able to be present in the amounts indicated above and the mixture advantageously comprising a binder such as lignosulfonate or a phosphate or synthetic resin or polyvinyl alcohol. To produce the small shaped bodies, a mixture is pelletized or briquetted. To produce the granular materials, large shaped bodies are produced and cured and are subsequently comminuted.

The invention claimed is:
1. A coarse-ceramic refractory batch (mix) comprising:
  a) at least one granular, refractory, mineral basic main component comprising one of an MgO- and a MgO and CaO-based refractory material and
  b) at least one granular, refractory, mineral, MgO-based, spinel-free elasticizing additive in a form selected from a group consisting of:
    b1) a forsterite material additive having the following particle size distribution: 1-6 mm: from 50 to 100% by weight, in particular from 70 to 80% by weight 0.25-1 mm: from 0 to 50% by weight, in particular from 20 to 30% by weight; and
    b2) a granular component additive composed of small shaped bodies which as ground powder mixtures comprise only the forsterite materials for in-situ formation of said forsterite material and have a particle size of from 0.3 to 8 mm, whereby the small shaped bodies are a mixture of ground powders of at least one MgO- and at least one $SiO_2$-component;
  whereby the additive being present in the batch (mix) in an amount which elasticizes the main component; and
  wherein said main component is present with the following particle size distribution, preferably in combination with the additive in a particle size distribution of a typical Fuller curve:
    1-8 mm: from 20 to 50% by weight, in particular from 45 to 50% by weight,
    0.25-1 mm: from 10 to 30% by weight, in particular from 15 to 20% by weight,
    <0.25 mm: from 20 to 60% by weight, in particular from 25 to 30% by weight.
2. The batch (mix) as claimed in claim 1, wherein the main component is magnesia.

3. The batch (mix) as claimed in claim 1 or 2, wherein:
the elasticizing additive is selected from a group consisting of:
a mineral olivine additive; a combination additive of olivine and forsterite, a forsterite material and a forsterite containing mixture which forms a forsterite material in situ under the action of heat during a batch formation; and
wherein said forsterite containing mixture is more than 50% by weight of a mineral fosterite.

4. The batch (mix) as claimed in claim 3, wherein:
said elasticizing additive is said forsterite containing mixture which forms said forsterite material in situ under the action of heat; and
the mixture comprises:
(a) from 50 to 80% by weight, in particular from 60 to 70% by weight, of MgO,
(b) from 20 to 50% by weight, in particular from 30 to 40% by weight, of $SiO_2$, and
(c) from 0 to 20% by weight, in particular from 1 to 5% by weight, of CaO.

5. The batch (mix) as claimed in claim 3, wherein:
said elasticizing additive is said forsterite containing mixture which forms said forsterite material in situ under the action of heat and contains, in particular in solid solution,
not more than 5% by weight of CaO;
not more than 25% by weight of MgO; and
not more than 7% by weight of $SiO_2$ above the stoichiometric weight ratio of forsterite.

6. The batch (mix) as claimed in claim 3, wherein the mixture or forsterite material comprises from 50 to 80% by weight, in particular from 60 to 70% by weight, of MgO, from 20 to 50% by weight, in particular from 30 to 40% by weight, of $SiO_2$, from 0 to 40% by weight, in particular from 1 to 10% by weight, of FeO and/or $Fe_2O_3$.

7. The batch (mix) as claimed in claim 3, wherein the mixture or forsterite material contains, in particular in solid solution, not more than 15% by weight of FeO and/or $Fe_2O_3$, not more than 25% by weight of MgO and not more than 7% by weight of $SiO_2$ above the stoichiometric weight ratio of forsterite.

8. The batch (mix) as claimed in claim 1, wherein:
the additive forsterite material has included periclase grains having, in particular, grain sizes in the range from 30 to 900 µm, preferably from 50 to 200 µm, dispersed in the forsterite material in amounts of, in particular, up to 25% by weight, preferably from 3 to 15% by weight.

9. The batch (mix) as claimed in claim 1, wherein the elasticizing additive is present in amounts of from 3 to 30% by weight, in particular from 10 to 20% by weight, based on the sum of elasticizer plus main component.

10. The batch (mix) as claimed in claim 1, wherein the shaped small bodies are pellets or briquettes or comprise granular material derived from comminuted pressed compacts.

11. The batch (mix) as claimed in claim 10, wherein the mixture comprises a binder.

12. The batch (mix) as claimed in claim 1, wherein the batch (mix) contains a binder such as cement, in particular aluminous cement, lignosulfonate, alkali metal silicate, phosphate or sulfate.

13. The batch (mix) as claimed in claim 1, wherein the batch (mix) contains pitch, preferably in amounts of from 2 to 5% by weight, or synthetic resin, preferably in amounts of from 3 to 4% by weight, as binder.

14. The batch (mix) as claimed in claim 1, wherein the batch (mix) contains carbon, in particular in the form of graphite, in particular in amounts of from 2 to 20% by weight.

15. The batch (mix) as claimed in claim 1, wherein the batch (mix) contains an elasticizing additive which is produced from a mixture of a finely pulverulent MgO component, selected from a group consisting of sintered magnesia, fused magnesia, and caustic magnesia, having an MgO content of from 90 to 100% by weight, in particular from 93 to 99% by weight, and any remaining amount containing a finely pulverulent $SiO_2$ component.

16. The batch (mix) as claimed in claim 15, wherein the mixture from which the elasticizing additive is produced additionally contains a finely divided CaO component such as quicklime and/or hydrated lime in amounts up to 20% by weight or an FeO and/or $Fe_2O_3$ component in amounts of up to 40% by weight.

17. A refractory product in the form of a pressed large shaped body which has been heat treated at temperatures in the range from 80 to 800° C., produced from a batch (mix) comprising:
a) at least one granular, refractory, mineral basic main component comprising one of an MgO- and an MgO and CaO-based refractory material and
b) at least one granular, refractory, mineral, MgO-based, spinel-free elasticizing additive in a form selected from a group consisting of:
b1) a forsterite material additive having the following particle size distribution: 1-6 mm: from 50 to 100% by weight, in particular from 70 to 80% by weight 0.25-1 mm: from 0 to 50% by weight, in particular from 20 to 30% by weight; and
b2) a granular component additive composed of small shaped bodies which as ground powder mixtures comprise only the forsterite materials for in-situ formation of said forsterite material and have a particle size of from 0.3 to 8 mm, whereby the small shaped bodies are a mixture of ground powders of at least one MgO- and at least one $SiO_2$-component;
whereby the additive being present in the batch (mix) in an amount which elasticizes the main component; and
wherein the main component is present with the following particle size distribution, preferably in combination with the additive in a particle size distribution of a typical Fuller curve:
1-8 mm: from 20 to 50% by weight, in particular from 45 to 50% by weight,
0.25-1 mm: from 10 to 30% by weight, in particular from 15 to 20% by weight,
<0.25 mm: from 20 to 60% by weight, in particular from 25 to 30% by weight.

18. The product as claimed in claim 17 produced by firing of the shaped body at temperatures in the range from 800 to 1800° C., in particular from 1400 to 1700° C.

19. The batch (mix) as claimed in claim 2, wherein the magnesia is selected from a group consisting of:
a sintered and/or fused magnesia, in particular magnesia having an MgO content in the range from 85 to 99% by weight, and
magnesia doloma, in particular magnesia doloma having an MgO content in the range from 42 to 88% by weight and a CaO content in the range from 10 to 50% by weight, and
doloma, in particular doloma having an MgO content in the range from 35 to 42% by weight and an CaO content in the range from 50 to 62% by weight.

20. The batch (mix) as claimed in claim 15, wherein said finely pulverulent $SiO_2$ component comprises quartz powder (flour), soapstone or olivine, having an $SiO_2$ content of from 30 to 100% by weight, in particular from 40 to 99% by weight, in the molar ratio $M_2S$ or with a desired excess of MgO over $M_2S$, by intimate mixing and subsequent ceramic firing of the mixture at temperatures of from 1600 to 2300° C., cooling and crushing of the fired product.

21. A coarse-ceramic refractory batch (mix) comprising:
a) at least one granular, refractory, mineral basic main component comprising one of an MgO- and a MgO and CaO-based refractory and
b) at least one granular, refractory, mineral, MgO-based, spinel-free elasticizing additive in a form selected from a group consisting of
 b1) a forsterite material additive having the following particle size distribution: 1-6 mm: from 50 to 100% by weight, in particular from 70 to 80% by weight 0.25-1 mm: from 0 to 50% by weight, in particular from 20 to 30% by weight; and
 b2) a granular component additive composed of small shaped bodies which as ground powder mixtures comprise only the forsterite materials for in-situ formation of said forsterite material and have a particle size of from 0.3 to 8 mm, whereby the small shaped bodies are a mixture of ground powders of at least one MgO- and at least one $SiO_2$-component;
whereby the additive being present in the batch (mix) in an amount which elasticizes the main component; and
wherein the additive forsterite material has included periclase grains having, in particular, grain sizes in the range from 30 to 900 μm, preferably from 50 to 200 μm, dispersed in the forsterite material in amounts of, in particular, up to 25% by weight, preferably from 3 to 15% by weight.

\* \* \* \* \*